United States Patent
Qian et al.

(10) Patent No.: US 11,225,544 B2
(45) Date of Patent: *Jan. 18, 2022

(54) STYRENE-FREE REACTIVE DILUENTS FOR URETHANE ACRYLATE RESIN COMPOSITIONS

(71) Applicant: Dow Global Technologies LLC, Midland, MI (US)

(72) Inventors: Huifeng Qian, Pearland, TX (US); Muhammad A. Shafi, Lake Jackson, TX (US); Luigi Pellacani, Carpi (IT); Harshad M. Shah, Missouri City, TX (US); Dwight D. Latham, Clute, TX (US); Qiuyun Xu, Pearland, TX (US); William L. Heaner, IV, Lake Jackson, TX (US); Emanuele Maiocchi, Casalpusterlengo (IT)

(73) Assignee: Dow Global Technologies LLC, Midland, MI (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/082,204

(22) PCT Filed: Mar. 1, 2017

(86) PCT No.: PCT/US2017/020220
§ 371 (c)(1),
(2) Date: Sep. 4, 2018

(87) PCT Pub. No.: WO2017/151782
PCT Pub. Date: Sep. 8, 2017

(65) Prior Publication Data
US 2020/0291166 A1    Sep. 17, 2020

(30) Foreign Application Priority Data

Mar. 4, 2016 (IT) .............................. 102016022861

(51) Int. Cl.
| | |
|---|---|
| *C08G 18/12* | (2006.01) |
| *B29C 39/00* | (2006.01) |
| *B29C 39/26* | (2006.01) |
| *C08G 18/32* | (2006.01) |
| *C08G 18/66* | (2006.01) |
| *C08G 18/67* | (2006.01) |
| *C08G 18/76* | (2006.01) |
| *B29K 75/00* | (2006.01) |
| *B29L 31/00* | (2006.01) |

(52) U.S. Cl.
CPC ............ *C08G 18/12* (2013.01); *B29C 39/003* (2013.01); *B29C 39/26* (2013.01); *C08G 18/3206* (2013.01); *C08G 18/6674* (2013.01); *C08G 18/672* (2013.01); *C08G 18/7621* (2013.01); *B29K 2075/00* (2013.01); *B29K 2905/02* (2013.01); *B29L 2031/722* (2013.01); *C08G 2150/00* (2013.01); *C08G 2170/00* (2013.01)

(58) Field of Classification Search
CPC ................ C08G 18/12; C08G 18/3206; C08G 18/6674; C08G 18/672; C08G 18/7621; C08G 2150/00; C08G 2170/00; B29C 39/003; B29C 39/26; B29K 2075/00; B29K 2905/02; B29L 2031/722
USPC ......................................................... 523/222
See application file for complete search history.

(56) References Cited

U.S. PATENT DOCUMENTS

| | | | |
|---|---|---|---|
| 4,424,333 A | 1/1984 | O'Connor et al. | |
| 5,571,863 A | 11/1996 | Smeal et al. | |
| 6,646,057 B1 | 11/2003 | Anders | |
| 7,326,752 B2 | 2/2008 | McAlvin et al. | |
| 8,211,967 B2 | 7/2012 | La Scala et al. | |
| 2001/0031838 A1* | 10/2001 | Scott ................... | C08F 283/006 525/455 |
| 2004/0010061 A1 | 1/2004 | Hewitt et al. | |
| 2007/0001343 A1* | 1/2007 | Pulman .................. | C09D 5/028 264/255 |
| 2007/0191505 A1* | 8/2007 | Takahashi ............ | C08G 18/672 522/178 |
| 2011/0073327 A1* | 3/2011 | Buergel .................. | C04B 26/16 166/382 |
| 2013/0195793 A1* | 8/2013 | Schwalm ............. | C09D 175/16 424/78.36 |

FOREIGN PATENT DOCUMENTS

AU    2004224898    5/2006

OTHER PUBLICATIONS

PCT/US2017/020220, International Search Report and Written Opinion dated May 15, 2017.
PCT/US2017/020220, International Preliminary Report on Patentability dated Sep. 4, 2018.

* cited by examiner

Primary Examiner — Hui H Chin

(57) ABSTRACT

A curable resin composition comprising: (1) a urethane (meth)acrylate; (2) a reactive diluent selected from the group consisting of i) a hydroxyl alkyl (meth)acrylate monomer where the acrylate group, which is attached to the carbonyl group, is attached to a hydrogen or a methyl group and the carbonyl group is attached to the hydroxyl group thru an R2 alkylene group containing 2 to 18 carbon atoms per molecule.

10 Claims, No Drawings

STYRENE-FREE REACTIVE DILUENTS FOR URETHANE ACRYLATE RESIN COMPOSITIONS

FIELD OF INVENTION

The instant invention relates to a curable urethane acrylate composition.

BACKGROUND OF THE INVENTION

Thermoset resins including unsaturated polyesters, vinyl esters, epoxies, polyurethanes, and urethane acrylates have wide application in fiberglass composite fabrications, such as marine structures (e.g. boat hulls), automobiles (e.g. truck bed covers, automobile trim and exterior panels), fiberglass construction products (e.g. showers, bathtubs), pipes, and tanks. Of these, the unsaturated polyester, vinyl esters, or urethane acrylates require reactive diluents to reduce the viscosity of resins. Without reactive diluents, unsaturated polyesters, vinyl esters, or urethane acrylates are solids or have a very high viscosity, which is not suitable for composite fabrication. Since the commercialization of unsaturated polyesters, styrene was almost the exclusive reactive diluent used due to the low cost, broad availability, ease of use and excellent mechanical properties.

Styrene is an inexpensive and high volume commodity chemical. The viscosity of styrene is very low (0.65 cps at 30° C.), making it a very effective diluent to obtain the desired process viscosity. In addition, the styrenated polyester, vinyl ester or urethane acrylate shows excellent thermal and mechanical properties.

However, styrene is regarded as a hazardous chemical, especially in the case of eye contact. Styrene is volatile and has high vapor pressure at room temperature (5 mmHg at 20° C.) and a low flash point (31° C.). The biggest concern to industry is that styrene is considered a suspect carcinogenic chemical. Currently, government regulations have restricted styrene emissions in open molding facilities. In the United States, Permissible Exposure Limit (PEL) is 100 ppm/8 hours and Short-Term Exposure Limit (STEL) is 600 ppm for 5 minutes/3 hours.

Other reactive monomers that are occasionally used with epoxy acrylates and methacrylates are methyl (meth)acrylate and vinyl toluene (including p-methyl styrene). Methyl (meth)acrylate has a very low flash point and can pose a safety hazard in many of the applications. On the other hand, most of the urethane (meth)acrylates either phase-separate or hydrogen bond in vinyl toluene.

Therefore, a styrene-free reactive diluent for thermoset resins is desired.

SUMMARY OF THE INVENTION

In one broad embodiment of the present invention, there is disclosed a curable resin composition comprising, consisting of, or consisting essentially of: (1) a urethane (meth) acrylate; (2) a reactive diluent selected from the group consisting of i) a hydroxyl alkyl (meth)acrylate monomer having a structure of

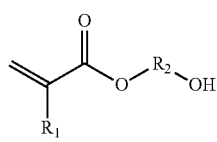

wherein $R_1$ is hydrogen or a methyl group and $R_2$ is an alkylene group containing 2 to 18 carbon atoms per molecule; and optionally a) a (meth)acrylate monomer which does not comprise hydroxyl alkyl (meth) acrylate; and/or b) an aromatic vinyl monomer.

In an alternative embodiment, the instant invention provides a composition in accordance with the previous embodiments, further comprising a free radical-generating catalyst.

In an alternative embodiment, the instant invention provides the composition, in accordance with the previous embodiments, further comprising an inhibitor.

In an alternative embodiment, the instant invention provides the composition in accordance with the previous embodiments wherein said curable resin composition comprises 10 to 90 percent by weight of said urethane (meth) acrylate and 10 to 90 percent by weight of said reactive diluent, based on the total weight of the curable resin composition.

In an alternative embodiment, the instant invention provides the composition in accordance with the previous embodiments, wherein said urethane (meth)acrylate is a reaction product of a polyisocyanate, a polyol, and a compound comprising a nucleophilic group and a (meth)acrylate group selected from the group consisting of hydroxyethyl acrylate, hydroxypropyl acrylate, hydroxyethyl methacrylate, hydroxyethyl acrylamide, hydroxypropyl acrylamide, and mixtures thereof.

In an alternative embodiment, the instant invention provides the composition in accordance with the previous embodiments, wherein the hydroxyl alkyl (meth)acrylate is selected from the group consisting of 2-hydroxyethyl methacrylate (HEMA), 2-hydroxyethyl acrylate (HEA), 2-hydroxypropyl methacrylate (HPMA), and 2-hydroxypropyl acrylate (HPA), the (meth)acrylate is selected from the group consisting of trimethylolpropane triacrylate (TMPTA), 1,6-hexanediol diacrylate (HDDA), 1,6-hexanediol dimethacrylate (HXMA), 1,4-butanediol diacryalte (BDDA), 1,4-butanediol dimethacrylate, dipropylene glycol diacrylate (DPGDA), methyl methacryalte, tert-butyl methacryalte (t-BMA), iso-butyl methacrylate (i-BMA), n-bugyl methacrylate (n-BMA), cyclohexyl methacryalte (CHMA), Benzyl methacrylate (BZMA), isobornyl methacrylate (IBXMA), glycidyl methacrylate (GMA), tetrahydrofurfuryl methacrylate (THFMA), allyl methacrylate (AMA), trifluoroethyl methacrylate (3FM), ethyl methacrylate, and 2-ethylhexyl methacrylate, and the aromatic vinyl monomer is selected from the group consisting of vinyl toluene, para methyl styrene, m-methylstyrene, divinyl benzene, 3-ethylstyrene, 4-ethylstyrene and related compounds.

In an alternative embodiment, the instant invention provides the composition in accordance with the previous embodiments, wherein said free radical-generating catalyst is selected from the group consisting of tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, azobis-isobutyronitrile, 2-t-butylazo-2-cyano-4-methylpentane, and 4-t-butylazo-4-cyano-valeric acid.

In an alternative embodiment, the instant invention provides

In an alternative embodiment, the instant invention provides the composition in accordance with the previous embodiments, wherein said inhibitor is selected from the group consisting of (2,2,6,6-Tetramethylpiperidin-1-yl)oxyl (TEMPO), Mono Methyl Ether of Hydroquinone (MEHQ), dihydroxybenzenes, benzoquinones, hindered phenols, and hindered phenols based on triazine derivatives.

In an alternative embodiment, the instant invention provides a filament winding process incorporating the curable resin composition of any one of the preceding embodiments.

In an alternative embodiment, the instant invention provides a pultrusion process incorporating the curable resin composition of any one of the preceding embodiments.

In an alternative embodiment, the instant invention provides a cured-in-place pipe process incorporating the curable resin composition of any one of the preceding embodiments.

DETAILED DESCRIPTION OF THE INVENTION

The instant invention is a curable resin composition. The instant invention is a curable resin composition comprising (1) a urethane (meth)acrylate, and (2) a reactive diluent.

The urethane (meth)acrylate can be synthesized through the reaction of polyisocyanates, polyols, and a compound containing both a nucleophilic group and a (meth)acrylate group.

The polyisocyanates used are typically aromatic, aliphatic, and cycloaliphatic polyisocyanates with a number average molar mass below 800 g/mol. Examples of diisocyanates include but not limit to toluene 2,4-/2,6-diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanateIIPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and also mixtures thereof.

The polyols used can include polyether polyols of various chain lengths in relation to the desired performance level of the resulting polymer. This also includes combinations of polyols that include at least two polyalkylene glycols having different equivalent weights, wherein the short-chain average equivalent weight is from 50 to 1000 and the long chain average equivalent weight is from 1000 to 20,000, preferably from 1000 to 10,000. The polyol can be selected from polyether polyols and polyester polyols. Preferably the polyols have a functionality of 2.0 or greater. Examples include Voranol 8000LM, Voranol 4000LM, Polyglycol P2000, Voranol 1010L, Polyglycol P425, TPG, Voranol 230-660 and mixtures thereof.

The polyurethane with free terminal isocyanate groups is capped with a compound containing the nucleophilic group (eg. hydroxyl, amino, or mercapto) and ethylenically unsaturated functionalities derived from (meth)acrylate. Preferred examples include 2-hydroxyethyl acrylate (HEA), 2-hydroxypropyl acrylate (HPA), 2-hydroxyethyl methacrylate (HEMA), 2-hydroxypropyl methacrylate (HPMA), and mixtures thereof.

Urethane (meth)acrylates utilized in this are prepared by two-step reactions. In the first step, the polyurethane oligomers are prepared by reacting an organic diisocyanate with a polyol in an equivalent ratio of NCO:OH from 1.4:1 to 3.0:1, using standard procedures, to yield an isocyanate-terminated prepolymer with controlled molecular weight. Any and all ranges between 1.4:1 and 3.0:1 are included herein and disclosed herein, for example, the NCO/OH ratio can range from about 1.4:1 to about 2.3:1. In the second step, polyurethane oligomers with free terminal isocyanate groups are capped with a compound containing the nucleophilic group (e.g. hydroxyl, amino or mercapto) and ethylenically unsaturated functionalities derived from (meth)acrylate by using methods well-known in the art, such as that disclosed in US 20010031838. The percent of free NCO in the final urethane acrylate is generally in the range of from 0 to 0.1 percent. Any and all ranges between 0 and 0.1 percent are included herein and disclosed herein, for example, the percent of free NCO in the final urethane acrylate can be in the range of from 0 to 0.001%. Alternatively, the so called "reverse process" can be used, in which the isocyanate is reacted first with the hydroxyl acrylate, and then with the polyols.

In some embodiments, a urethane catalyst can be used to accelerate the reaction. Examples of urethane catalysts include, but are not limited to tertiary amines and metal compounds such as stannous octoate and dibutyltin dilaurate. The urethane catalyst is preferably employed in an amount in the range of from 25 to 400 ppm based on total weight of the resin formulation.

Additionally, in some embodiments, an inhibitor can be added to avoid the free radical polymerization of (meth)acrylates. Preferred inhibitors include (2,2,6,6-Tetramethylpiperidin-1-yl)oxyl (TEMPO), Mono Methyl Ether of Hydroquinone (MEHQ), dihydroxybenzenes, benzoquinones, hindered phenols, and hindered phenols based on triazine derivatives. The preferred percentage of inhibitor in total weight is 50 to 1000 ppm based on total weight of the resin formulation.

Commercially available urethane (meth)acrylates can also be used. These include, but are not limited to urethane (meth)acrylate from Sartomer including CN 1963, CN9167, CN 945A60, CN 945A70 CN 944B85, CN 945B85, CN 934, CN 934X50, CN 966A80, CN 966H90, CN 966J75, CN 968, CN 981, CN 981A75, CN 981B88, CN 982A75, CN 982B88, CN 982E75, CN 982P90, CN 983B88, CN 985B88, CN 970A60, CN 970E60, CN 971A80, CN 972, CN 973A80, CN 977C70, CN 975, CN 978, all available from Sartomer. Mixtures thereof can also be used.

Another example of a urethane (meth)acrylate obtainable from commercial sources is 4000LM Urethane acrylate available from The Dow Chemical Company.

As mentioned previously, a combination of polyols with different equivalent weight may be advantageously used resulting in urethane (meth)acrylates with different molecular weight. The weight ratio of low molecular weight urethane (meth)acrylate and high molecular weight urethane (meth)acrylate respectively based on polyols having equivalent weights from 50 to 1000, and from 1000 to 20,000, generally ranges from 0.1:1 to 25:1.

The curable resin composition may comprise 10 to 90 percent by weight of urethane (meth)acrylate. All individual values and subranges from 10 to 90 weight percent are included herein and disclosed herein; for example, the weight percent of urethane (meth)acrylate can be from a lower limit of 20, 30, 35, or 40 weight percent to an upper limit of 65, 70, or 80 weight percent. For example, the curable resin composition may comprise 10 to 90 percent by weight of urethane (meth)acrylate; or in the alternative, the curable resin composition may comprise 20 to 80 percent by weight of urethane (meth)acrylate; or in the alternative, the curable resin composition may comprise 30 to 70 percent by weight of urethane (meth)acrylate; or in the alternative, the curable resin composition may comprise 40 to 65 percent by weight of urethane (meth)acrylate.

The reactive diluent is a liquid reaction medium containing at least one ethylenic double bond. The reactive diluent is curable by polymerization in the presence of a free radical catalyst. The reactive diluent does not contain styrene. The reactive diluent comprises an hydroxyl alkyl (meth)acrylate monomer of the formula below:

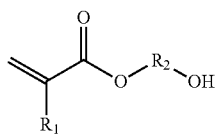

wherein, $R_1$ is a hydrogen atom or methyl group and $R_2$ is a alkylene group containing from 2 to 18 carbon atoms.

Examples of hydroxyl alkyl (meth)acrylate monomers are 2-hydroxyethyl methacrylate (HEMA), 2-hydroxyethyl acrylate (HEA), 2-hydroxypropyl methacrylate (HPMA), 2-hydroxypropyl acrylate (HPA) and related compounds.

The reactive diluent may further comprise one of the following: a (meth)acrylate monomer (which is not an hydroxyl alkyl (meth)acrylate monomer) or an aromatic vinyl monomer.

Examples of (meth)acrylates used as reactive diluents include but are not limited to trimethylolpropane triacrylate (TMPTA), 1,6-hexanediol diacrylate (HDDA), 1,6-hexanediol dimethacrylate (HXMA), 1,4-butanediol diacryalte (BDDA), 1,4-butanediol dimethacrylate, dipropylene glycol diacrylate (DPGDA), methyl methacryalte, tert-butyl methacryalte (t-BMA), iso-butyl methacrylate (i-BMA), n-bugyl methacrylate (n-BMA), cyclohexyl methacryalte (CHMA), Benzyl methacrylate (BZMA), isobornyl methacrylate (IBXMA), glycidyl methacrylate (GMA), tetrahydrofurfuryl methacrylate (THFMA), allyl methacrylate (AMA), trifluoroethyl methacrylate (3FM), ethyl methacrylate, 2-ethylhexyl methacrylate and related compounds and mixtures thereof.

Examples of aromatic vinyl monomers used as reactive diluents include but are not limited to vinyl toluene, para methyl styrene, m-methylstyrene, divinyl benzene, 3-ethylstyrene, 4-ethylstyrene and related compounds and mixtures thereof.

Generally, the weight ratio of the hydroxyl (meth)acrylate and the other (meth)acrylate or vinyl monomer is from 100:1 to 1:100. Any and all ranges falling within 100:1 to 1:100 are included herein and disclosed herein; for example, the weight ratio can be from 10:1 to 1:10 or from 7:3 to 3:7.

The curable resin composition may comprise 10 to 90 percent by weight of reactive diluents. All individual values and subranges from 10 to 90 weight percent are included herein and disclosed herein; for example, the curable resin composition may comprise 20 to 80 percent by weight of reactive diluent; or in the alternative, the curable resin composition may comprise 35 to 60 percent by weight of reactive diluent; or in the alternative, the curable resin composition may comprise 35 to 60 percent by weight of reactive diluent.

In various embodiments, the curable composition further comprises a free radical-generating catalyst. Suitable free radical-generating catalysts include peroxide or azo type compounds. The preferred peroxide catalysts includes organo peroxides and hydroperoxides such as tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. The preferred azo compounds include azobis-isobutyronitrile, 2-t-butylazo-2-cyano-4-methylpentane, and 4-t-butylazo-4-cyano-valeric acid.

The curable resin composition may comprise 0.1 to 5 percent by weight of a free radical-generating catalyst. All individual values and subranges from 0.1 to 5 weight percent are included herein and disclosed herein; for example, the curable resin composition may comprise 0.5 to 1 percent by weight of free radical-generating catalyst; or in the alternative, the curable resin composition may comprise 1 to 2 percent by weight of free radical-generating catalyst; or in the alternative, the curable resin composition may comprise 2 to 4 percent by weight of free radical-generating catalyst.

In production of the curable resin composition, the method for producing such a composition includes blending or mixing urethane (meth)acrylates, reactive diluents and a free radical catalyst at temperature from 10° C. to 40° C. In another embodiment, the method includes blending or mixing urethane (meth)acrylates and reactive diluents first for long time storage (generally more than one month) and then adding the free radical catalyst.

In various embodiments, the curable composition further comprises an inhibitor to avoid free radical polymerization of the (meth)acrylates. Suitable inhibitors include, but are not limited to (2,2,6,6-Tetramethylpiperidin-1-yl)oxyl (TEMPO), Mono Methyl Ether of Hydroquinone (MEHQ), dihydroxybenzenes, benzoquinones, hindered phenols, and hindered phenols based on triazine derivatives.

The inhibitor is generally present in the curable resin composition in the range of from 50 to 1000 ppm by weight. For example, the curable resin composition may comprise 50 to 100 ppm by weight of inhibitor or in the alternative; the curable resin composition may comprise 100-200 ppm by weight of inhibitor.

Other optional compounds that may be added to the curable composition of the present invention may include compounds that are normally used in resin formulations known to those skilled in the art for preparing curable compositions. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

Other optional compounds or additives that may be added to the curable composition of the present invention may include, for example, other co-catalysts, de-molding agents; a solvent to lower the viscosity of the formulation further, fillers, pigments, toughening agents, flow modifiers, adhesion promoters, diluents, stabilizers, plasticizers, catalyst de-activators, flame retardants, and mixtures thereof.

Generally, the amount of other optional components or additives, when used in the present invention, may be for example, from 0 wt % to about 50 wt % in one embodiment, from about 0.01 wt % to about 40 wt % in another embodiment; from about 0.1 wt % to about 10 wt % in still another embodiment; and from about 0.2 wt % to about 5 wt % in yet another embodiment.

The polymerization and curing of the urethane acrylate resin is effected, using well-known procedures in the art, preferably in the presence of a polymerization catalyst. The resin composition may be thermal cured or light cured. As for thermal curing, curing temperature is dependent on the particular catalyst utilized. In one embodiment, the curable resin composition can be cured from 25° C. to 200° C.; in another embodiment, the curable resin composition can be cured from 70° C. to 150° C. As for light curing, the light source is dependent on the particular photoinitiator catalyst utilized. Light source can be visible light or UV light.

Urethane Acrylate resins contain urethane groups which provide toughness to the resin and improves adhesion to substrates and or fibers without dealing with isocyanate groups that are present in urethane resins. They provide performance of high end composite resins such as epoxy and polyurethanes with a reactivity that is commonly found in polyester and vinyl ester resins.

The crosslinked polymers using the curable resin composition can be used in general in a variety of composite processing technologies such as oil well casting, geothermal piping, and tank applications, filament winding, infusion, pultrusion, cured-in-place pipe applications, resin transfer molding, prepregging, compression molding, and the like. A cured article prepared from the curable resin composition can be used to produce composites, coatings, adhesives, inks, encapsulations, or castings. The curable resin composition can be used to produce composites, such as, for example, wind turbines, boat hulls, truck bed covers, automobile trim and exterior panels, pipe, tanks, window liners, seawalls, composite ladders and the like.

EXAMPLES

The present invention will now be explained in further detail by showing Inventive Examples, and Comparative Examples, but the scope of the present invention is not, of course, limited to these Examples.
1. Chemicals
Isocyanates and Polyols

| Isocyanates | Suppliers | Weight % NCO | Functionality | IEW | Viscosity at 100° F. |
|---|---|---|---|---|---|
| ISONATE OP50 | Dow Chemical | 33.50 | 2.00 | 125.50 | 4.10 |
| VORANATE T-80 | Dow Chemical | 48.20 | 2.00 | 87.10 | 2.20 |

| Polyols | | OH Number | Functionality | HEW | Viscosity at 100° F. |
|---|---|---|---|---|---|
| Voranol 8000LM | Dow Chemical | 14.00 | 2.00 | 4000.00 | 1900.00 |
| Voranol 4000LM | Dow Chemical | 28.00 | 2.00 | 2000.00 | 480.00 |
| Polyglycol P2000 | Dow Chemical | 56.10 | 2.00 | 1000.00 | 160.00 |
| Voranol 1010L | Dow Chemical | 110.00 | 2.00 | 508.00 | 145 at 77° F. |
| Polyglycol P425 | Dow Chemical | 264.00 | 2.00 | 212.50 | 35.00 |
| TPG | Dow Chemical | 875.00 | 2.00 | 96.2 | 57.2 at 77° F. |
| Voranol 230-660 (CP260) | Dow Chemical | 660.00 | 3.00 | 85.00 | 300.00 |

Reactive Diluents

| Reactive Diluents | Suppliers | Flash Point ° C. | Functionality | Tg of homopolymer |
|---|---|---|---|---|
| Vinyl Toluene | Deltech Corporation | 53 | 1 | 110 |
| HEA (ROCRYL ™ 420) | Dow Chemical | 101 | 1 | −15 |
| HEMA (ROCRYL ™ 400) | Dow Chemical | 106 | 1 | 57 |
| HPMA (ROCRYL ™ 410) | Dow Chemical | 95 | 1 | 76 |
| Divinyl Benzene | Deltech Corporation | 64 | 2 | — |
| TMPTA (SR351) | Sartomer | 194 | 3 | 62 |

1.3 Capping Agent
ROCRYL™ 400 Hydroxyethyl Methacryalte and ROCRYL™ 410
Hydroxypropyl Methacrylate obtained from Dow Chemical Company are used as capping agents.
2. Procedures
  2.1 Synthesis of Urethane Acrylate
  In a typical procedure, 110.8 g of VORANATE T-80, 46.2 g of VORANOL 8000LM, 27.2 g of TPG and 30.4 g of Voranol 230-660 30.4 g were added to a 1 liter flask. The reaction started at room temperature. Due to exotherm, the reaction temperature increased to 60-70° C. in 20 min. Then, the reaction was kept at 70° C. for 2 hrs until achieving the target NCO concentration (~12%). Then, reaction temperature was set at 42-47° C. 111.02 g of HPMA, 0.05 g of TEMPO and 0.05 g of Dabco T-12 catalyst was added to flask to cap the urethane prepolymer. Meanwhile, 117.59 g of vinyl toluene was added to reduce the viscosity in the capping step. After 1 hour, the additional reactive diluent (96.84 g of HEMA) was added to further reduce the viscosity. Until all NCO groups were capped, the product was cooled down to room temperature and discharge.
  2.2. Plaque Preparation of Urethane Acrylate
  The molds were made from "U"-shaped, ⅛ inch thick aluminum spacers positioned between two sheets of Duo-foil aluminum and compressed between two thick heavy metal plates. The Duo-foil aluminum sheets were coated with a proprietary release agent. A rubber tubing was used for gasket material following the inside dimensions of the spacer. Once assembled, the mold was clamped together with large C-clamps. The open end of the "U"-shaped spacer faced upward, and the duo-foil extended to the edge of the metal plates. The top edge of the Duo-foil was higher than the edge of the metal plates and bent for the filling of reaction mixture. The plaque was cured at 100° C. for 1-2 hr.
  2.3 Viscosity Analysis
  The viscosity measurement was performed on Rheometer AR2000 from TA instruments. The shear rate was 10/s and testing temperature was 25° C.

2.4. Dynamic Mechanical Thermal Analysis

Glass transition temperature (Tg) was determined by Dynamic Mechanical Thermal Analysis (DMTA), using a TA instrument Rheometer (Model: ARES). Rectangular samples (around 6.35 cm×1.27 cm×0.32 cm) were placed in solid state fixtures and subjected to an oscillating torsional load. The samples were thermally ramped from about 25° C. to about 200° C. at a rate of 3° C./minute and 1 Hertz (Hz) frequency.

2.5 Tensile and Fracture Toughness Test

Tensile tests were performed using ASTM D638 (Type I) method. Fracture toughness (K1C) of materials was measured according to ASTM D5045 by a screw-driven material testing machine (Instron model 5567). Compact-tension geometry was used.

C2. Results and Discussion

TABLE 1

Examples of styrene free urethane acrylate resin compositions

| | Example | Inventive Example 1 | Inventive Example 2 | Inventive Example 3 | Inventive Example 4 | Inventive Example 5 | Inventive Example 6 | Inventive Example 7 | Inventive Example 8 | Comparative Example 1 |
|---|---|---|---|---|---|---|---|---|---|---|
| Urethane acrylate | Isocyanate | | | | | | | | | |
| | VORANATE T-80 | 18.64 | 21.86 | 22.21 | 20.23 | 20.53 | 21.26 | 21.27 | | 22.02 |
| | ISONATE OP50 | | | | | | | | 16.25 | |
| | Polyols | | | | | | | | | |
| | Voranol 1010 L | | | | | | | | 31.57 | |
| | 8000LM | | 5.42 | 8.39 | 7.64 | 8.57 | 6.3 | 8.03 | | 8.31 |
| | 4000LM | 9.33 | | | | | | | | |
| | P425 o P400 | 9.33 | 11.61 | | | | 3.36 | | | |
| | Voranol 230-660 | | | 5.74 | 5.85 | 5.63 | | 2.01 | | 2.08 |
| | TPG | 9.33 | 11.61 | 6.42 | 5.23 | 5.03 | 10.77 | 10.07 | | 10.42 |
| | Capping agents | | | | | | | | | |
| | HEMA | | | 15.5 | 13.76 | | | | 8.85 | 22.2 |
| | HPMA | 9.9 | 9.52 | | | 20.56 | 20 | 20 | | |
| Styrene free Reactive Diluents | HEMA | | | 41.73 | 29.28 | 17.93 | 11.75 | 21.42 | 6.19 | |
| | HPMA | 42.5 | 40 | | | | | | | |
| | Vinyl Toluene | | | | 18.01 | 21.76 | 26.76 | 12.28 | | 34.99 |
| | TMPTA | | | | | | 5.32 | 5.32 | | |
| | MMA | | | | | | | | 37.14 | |
| | % Reactive diluents | 42.92% | 39.99% | 41.73% | 47.29% | 39.69% | 41.54% | 38.86% | 43.33% | 42% |
| Initiator | Total | 99.03 | 100.02 | 99.99 | 100 | 100.01 | 105.52 | 100.4 | 100 | |
| | Trigonox 23-c75 | 1% | 1% | 1% | 1% | 1% | 1% | 1% | | |
| | Trigonox 23 | | | | | | | | 1% | |
| Properties | Visco at 25° C. of total formulation (Pa · s) | 2.27 | 3.97 | 2.3 | 0.58 | 0.8 | 0.8 | 1.1 | — | Phase separation |
| | Tensile Strength—Mpa | 43.4 | 62.2 | 53.4 | 43.7 | 41 | 63.8 | 44 | 22 | |
| | Tensile Modulus—Mpa | 2197 | 2932 | 2800 | 2740 | 2580 | 3081 | 2921 | 540 | |
| | Tensile Strain % | 4.2 | 3.7 | 2.9 | 3.14 | 2 | 4.1 | 1.8 | 95 | |
| | DMTA—Tg ° C. | 89 | 93 | 121 | 121 | 123 | 112 | 117 | 81 | |
| | K1C—Mpa · m$^{1/2}$ | | | 1.83 | 1.51 | 1.49 | 1.86 | 1.35 | | |

Table 1 shows the examples of styrene free urethane acrylate resin compositions, which mainly comprise urethane (meth)acrylate and reactive diluents. The urethane (meth)acrylate was synthesized through the reaction between polyisocyanates, polyols and capping agent—hydroxyl alkyl (meth)acrylate. The isocyanates were selected from Voranate T-80 and Isonate OP50. The polyols were selected from Voranol 1010 L, Voranol 8000LM, Voranol 4000LM, Polyglycol P425, Voranol 230-660, TPG or a mixture thereof. The examples of capping agents were hydroxyethyl methacryalte or hydroxypropyl methacrylate, respectively.

The styrene-free reactive diluents were composed of hydroxyl alkyl (meth)acrylate monomer and other (meth)acrylate or aromatic vinyl monomers. For example, the reactive diluents were be selected from hydroxyethyl methacryalte (HEMA), hydroxypropyl methacrylate (HPMA), Vinyl Toluene, Trimethylolpropane triacrylate (TMPTA), methyl methacrylate (MMA), or a mixture thereof. In addition, around 100 ppm of TEMPO is used as inhibitor to prevent the self-polymerization of resin compositions.

In one typical inventive example (e.g. Inventive Example 3), urethane (meth)acrylate is prepared through the reaction of 22.21 g of VORANATE T-80, 8.39 g of Voranol 8000LM, 5.74 g of Voranol 230-660, 6.42 g of TPG and 15.5 g of HEMA according to the procedure mentioned above. The reactive diluent in this example is 41.73 g of HEMA. In the total formulation, the weight percentage of urethane acrylate is 58.27% and the weight percentage of reactive diluent is 41.73%. The viscosity of the formulation is 2.27 Pa.s at 25° C. The thermal and mechanical properties were in alignment with the urethane acrylate with styrene as reactive diluent (e.g. Crestapol 1250LV from Scott Badar).

In Comparative Example 1, vinyl toluene was the predominant reactive diluent for urethane acrylate. The final resin formulation exhibited two separated phases, that is, the urethane acrylate phase and vinyl toluene phase. In contrast, the final resin formulations in Inventive Examples 1-9 were all homogeneous solutions. The existence of hydroxyl alkyl (meth)acrylate in the reactive diluents improved the compatibility between urethane acrylate and vinyl toluene.

The invention claimed is:

1. A curable resin composition comprising:
   (1) a urethane (meth)acrylate;
   (2) a reactive diluent selected from the group consisting of
      i) a hydroxyl alkyl (meth)acrylate monomer having a structure of

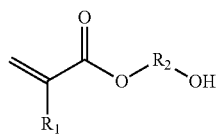

wherein $R_1$ is hydrogen or a methyl group and $R_2$ is an alkylene group containing 2 to 18 carbon atoms per molecule; and
      a) a (meth)acrylate monomer which does not comprise hydroxyl alkyl (meth) acrylate; and/or
      b) a styrene-free aromatic vinyl monomer;
   (3) a free radical-generating catalyst selected from the group consisting of tert-butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, azobis-isobutyronitrile, 2-t-butylazo-2-cyano-4-methylpentane, and 4-t-butylazo-4-cyano-valeric acid;
   wherein said curable resin composition comprises 45 to 90 percent by weight of said urethane (meth)acrylate and 10 to 55 percent by weight of said reactive diluent, based on the total weight of the curable resin composition.

2. The curable resin composition of claim 1, further comprising an inhibitor.

3. The curable resin composition according to claim 1, wherein said urethane (meth)acrylate is a reaction product of a polyisocyanate, a polyol, and a compound comprising a nucleophilic group and a (meth)acrylate group selected from the group consisting of hydroxyethyl acrylate, hydroxypropyl acrylate, hydroxyethyl methacrylate, hydroxyethyl acrylamide, hydroxypropyl acrylamide, and mixtures thereof.

4. The curable resin composition according to claim 1, wherein the hydroxyl alkyl (meth)acrylate is selected from the group consisting of 2-hydroxyethyl methacrylate (HEMA), 2-hydroxyethyl acrylate (HEA), 2-hydroxypropyl methacrylate (HPMA), and 2-hydroxypropyl acrylate (HPA), the (meth)acrylate is selected from the group consisting of trimethylolpropane triacrylate (TMPTA), 1,6-hexanediol diacrylate (HDDA), 1,6-hexanediol dimethacrylate (HXMA), 1,4-butanediol diacryalte (BDDA), 1,4-butanediol dimethacrylate, dipropylene glycol diacrylate (DPGDA), methyl methacryalte, tert-butyl methacryalte (t-BMA), iso-butyl methacrylate (i-BMA), n-butyl methacrylate (n-BMA), cyclohexyl methacryalte (CHMA), benzyl methacrylate (BZMA), isobornyl methacrylate (IBXMA), glycidyl methacrylate (GMA), tetrahydrofurfuryl methacrylate (THFMA), allyl methacrylate (AMA), trifluoroethyl methacrylate (3FM), ethyl methacrylate, and 2-ethylhexyl methacrylate, and the styrene-free aromatic vinyl monomer is selected from the group consisting of vinyl toluene, para-methyl styrene, m-methylstyrene, divinyl benzene, 3-ethyl-styrene, and 4-ethylstyrene.

5. The curable resin composition of claim 2, wherein said inhibitor is selected from the group consisting of (2,2,6,6-tetramethylpiperidin-1-yl)oxy) (TEMPO), mono methyl ether of hydroquinone (MEHQ), dihydroxybenzenes, benzoquinones, hindered phenols, and hindered phenols based on triazine derivatives.

6. A filament winding process incorporating the curable resin composition of claim 1.

7. A pultrusion process incorporating the curable resin composition of claim 1.

8. A cured-in-place pipe process incorporating the curable resin composition of claim 1.

9. An infusion process incorporating the curable resin composition of claim 1.

10. A cured article comprising a composite, a coating, an adhesive, an ink, an encapsulation, or a casting made from the composition of claim 1.

* * * * *